(12) United States Patent
Zhou et al.

(10) Patent No.: US 10,574,164 B2
(45) Date of Patent: Feb. 25, 2020

(54) FAULT-TOLERANT FIELD-ORIENTED CONTROL METHOD OF FIVE-PHASE INTERIOR PERMANENT-MAGNET LINEAR MOTOR UNDER TWO NONADJACENT SHORT-CIRCUIT PHASE FAULTS

(71) Applicant: Jiangsu University, Jiangsu (CN)

(72) Inventors: Huawei Zhou, Jiangsu (CN); Guohai Liu, Jiangsu (CN); Jinghua Ji, Jiangsu (CN); Wenxiang Zhao, Jiangsu (CN); Qian Chen, Jiangsu (CN); Long Chen, Jiangsu (CN)

(73) Assignee: Jiangsu University (CN)

( * ) Notice: Subject to any disclaimer, the term of this patent is extended or adjusted under 35 U.S.C. 154(b) by 74 days.

(21) Appl. No.: 15/748,926

(22) PCT Filed: Aug. 17, 2016

(86) PCT No.: PCT/CN2016/095627
§ 371 (c)(1),
(2) Date: Jan. 30, 2018

(87) PCT Pub. No.: WO2018/018672
PCT Pub. Date: Feb. 1, 2018

(65) Prior Publication Data
US 2019/0006973 A1     Jan. 3, 2019

(30) Foreign Application Priority Data

Jul. 26, 2016   (CN) .......................... 2016 1 0591974

(51) Int. Cl.
*H02P 21/14*      (2016.01)
*H02P 25/064*     (2016.01)
(Continued)

(52) U.S. Cl.
CPC ................ *H02P 21/14* (2013.01); *B60K 1/00* (2013.01); *H02P 21/22* (2016.02); *H02P 21/50* (2016.02);
(Continued)

(58) Field of Classification Search
CPC .......... H02P 21/14; H02P 21/22; H02P 25/22; H02P 27/04; H02P 29/032; B60K 1/00; G01R 31/34; G06F 17/10
See application file for complete search history.

(56) References Cited

U.S. PATENT DOCUMENTS

| 2011/0221366 A1* | 9/2011 | Gallegos-Lopez ..... H02P 21/06 318/400.02 |
| 2011/0224957 A1* | 9/2011 | Ransom ............ H02M 7/53873 703/2 |

(Continued)

FOREIGN PATENT DOCUMENTS

| CN | 10219551 A | 9/2011 |
| CN | 102684577 A | 9/2012 |

(Continued)

OTHER PUBLICATIONS

E. Chiricozzi and M. Villani, "Analysis of fault-tolerant five-phase IPM synchronous motor," 2008 IEEE International Symposium on Industrial Electronics, Cambridge, 2008, pp. 759-763. <URL: http://ieeexplore.ieee.org/stamp/stamp.jsp?tp=&arnumber=4676949 &isnumber=4676877> (Year: 2008).*

(Continued)

*Primary Examiner* — Eduardo Colon Santana
*Assistant Examiner* — Said Bouziane
(74) *Attorney, Agent, or Firm* — Greenberg Traurig, LLP (57) ABSTRACT

The invention proposes a fault-tolerant field-oriented control method of five-phase interior permanent-magnet fault-toler-
(Continued)

ant linear motor (IPM-FTLM) with two nonadjacent short-circuit phase faults. Firstly, the extended Clark transformation matrix can be obtained according to the principle that magnetic motive force (MMF) keeps constant before and after the two-phase open-circuit faults, the constraint that the sum of healthy phase currents is zero and the adjacent two-phase current amplitude is equal. The back electric motive force (EMF) can be estimated by the transposed matrix. The nonlinear strong coupling system becomes the first-order inertia system when using the internal mode controller, the first-order inertia feed-forward voltage compensator and back-EMF observer, as the motor is with fault. Then, according to the principle that the sum of MMF of the healthy phase short-circuit compensation currents and two phases short-circuit fault currents is zero, the short-circuit compensation voltage can be obtained, and then these voltages add vector-controller output voltages, respectively. The invention not only restrains the thrust force fluctuation caused by two nonadjacent short-circuit phase faults, but also more importantly keeps the same dynamic and steady performance as the normal conditions, and also it has the constant switching frequency of voltage source inverter.

5 Claims, 4 Drawing Sheets

(51) Int. Cl.
*B60K 1/00* (2006.01)
*H02P 29/024* (2016.01)
*H02P 21/00* (2016.01)
*H02P 29/032* (2016.01)
*H02P 21/22* (2016.01)
*H02P 25/22* (2006.01)
*H02P 27/04* (2016.01)

(52) U.S. Cl.
CPC ............ *H02P 25/064* (2016.02); *H02P 25/22* (2013.01); *H02P 27/04* (2013.01); *H02P 29/027* (2013.01); *H02P 29/0243* (2016.02); *H02P 29/032* (2016.02); *B60Y 2400/60* (2013.01)

(56) References Cited

U.S. PATENT DOCUMENTS

2011/0298404 A1* 12/2011 Okumatsu ........... H02P 29/0243
318/400.21
2016/0028343 A1* 1/2016 Choi .................... H02P 29/032
318/701

FOREIGN PATENT DOCUMENTS

| CN | 103973191 A | 8/2014 |
| CN | 104270063 A | 1/2015 |
| CN | 104682807 A | 6/2015 |
| CN | 105245156 A | 1/2016 |

OTHER PUBLICATIONS

L. Parsa and H. A. Toliyat, "Fault-Tolerant Interior-Permanent-Magnet Machines for Hybrid Electric Vehicle Applications," in IEEE Transactions on Vehicular Technology, vol. 56, No. 4, pp. 1546-1552, Jul. 2007. <URL: http://ieeexplore.ieee.org/stamp/stamp.jsp?tp=&arnumber=4273747&isnumber=4273706> (Year: 2007).*

* cited by examiner

FAULT-TOLERANT FIELD-ORIENTED CONTROL METHOD OF FIVE-PHASE INTERIOR PERMANENT-MAGNET LINEAR MOTOR UNDER TWO NONADJACENT SHORT-CIRCUIT PHASE FAULTS

CROSS REFERENCE TO RELATED APPLICATIONS

The present application is a 371 U.S. National Stage of International Application No. PCT/CN2016/095627, filed Aug. 17, 2016, entitled "FAULT-TOLERANT FIELD-ORIENTED CONTROL METHOD OF FIVE-PHASE INTERIOR PERMANENT-MAGNET LINEAR MOTOR UNDER TWO NONADJACENT SHORT-CIRCUIT PHASE FAULTS" which in turn claims priority to Chinese Application 201610591974.0 with the same title filed Jul. 26, 2016, both of which are incorporated herein by reference in their entirety.

TECHNICAL FIELD

The invention is related to a fault-tolerant control method of five-phase permanent magnet motor with two nonadjacent phase faults, especially the fault-tolerant field-oriented control method of five-phase IPM-FTLM with two nonadjacent short-circuit phase faults. It can be used in aerospace, electric vehicles, deep sea, medical devices and so on, where high requirements for motor are required on reliability and dynamic performance.

BACKGROUND TECHNOLOGY

Along with the evolution of community and the rise of people's living standard, the requirements on comfort and safety stability of the car riding are getting higher and higher. Active suspension system gets more attention as an important part of modern cars, because it has a very important influence on the riding stability and reliability. Meanwhile, the researches of tubular linear motor are drawn more attention as the key component of active suspension system. Furthermore, the fault-tolerant performance of the motor with short-circuit faults directly determines the reliability of electromagnetic suspension and the ability of continuous operation.

When fault-tolerant motor is with one or two short-circuit phase faults, the motor can still have a certain thrust force or torque output capability. However, the higher thrust force or torque fluctuation and noise seriously deteriorate the system performance. The aim of Fault-tolerant control is to optimize the fault-tolerant currents according to different operation condition, and to make the output thrust force or torque of the motor smooth as much possible as it can, thus having nearly the same performance as that under healthy condition. The application number of China's invention patent is 201510059387.2—"A short-circuit fault-tolerant control method for five-phase fault-tolerant permanent-magnet motor". To achieve the smooth operation of the five-phase fault-tolerant surface-mounted permanent magnet rotary motor, the impact of the short-circuit faults on the torque was divided into two parts. Part one is the impact of the open-circuit phase fault on torque, and the other part is the impact of short-circuit phase current on torque. The principle of constant magnetic motive force (MMF) before and after fault and the principle of equal amplitude of the phase currents after fault are used to optimize the phase currents of the remaining healthy phases. Meanwhile, to restrain the torque fluctuation caused by short-circuit currents, the healthy phase compensation currents are calculated based on the principle that post-fault MMF is zero and the minimum copper loss. Then, the current references of remaining healthy phases can be obtained by adding the two above mentioned currents. According to the obtained remaining healthy phase currents, the current hysteresis loop control strategy was adopted to control the five-phase fault-tolerant permanent-magnet rotary surface-mount motor. In this method, the amplitude of the remaining healthy phase compensation currents which used to restrain torque fluctuation caused by short-circuit phase currents is constant, and it has nothing to do with the motor speed. Meanwhile, the sum of remaining healthy phase currents is not zero. And also it is not suitable for fault-tolerant operation in the case of two phase faults (open-circuit phase faults; short-circuit phase faults; one open-circuit phase fault and the other short-circuit phase fault). At present, the common fault-tolerant control methods are to calculate the fault-tolerant currents, and then adopt the current hysteresis loop strategy to control motor. However, these methods have the problems about chaotic switching frequency, large noise and poor dynamic performance. So these methods are not suitable for motor with high power and high requirement on dynamic performance. The application number of China's invention patent is 201510661212.9—"A short-circuit fault-tolerant field-oriented control method of fault-tolerant tubular linear motor with interior hybrid magnetic materials". To accomplish the fault-tolerant operation of the five-phase fault-tolerant tubular linear motor with interior hybrid magnetic materials, which is with one short-circuit phase fault, the same method as mentioned above was used to optimize the remaining healthy currents, then the field-oriented control strategy was adopted to achieve the motor's field-oriented operation under one short-circuit phase fault. Although this method achieves the high fault-tolerant performance, high dynamic performance and good current tracking performance of the motor system with short-circuit faults, but this method cannot achieve fault-tolerant operation under two phase faults (open-circuit phase faults; short-circuit phase faults; or one open-circuit phase fault and the other short-circuit phase fault).

CONTENTS OF THE INVENTION

Due to the shortcomings of the motor's existing fault-tolerant control technology, according to the features of five-phase IPM-FTLM and two nonadjacent phase faults (open-circuit phase faults; short-circuit phase faults; or one open-circuit phase fault and the other short-circuit phase fault), the purpose of this invention is to overcome the shortcomings of the existing fault-tolerant strategy used current hysteresis loop technology when the faults occur in two nonadjacent phases (open-circuit phase faults, short-circuit phase faults, or one open-circuit phase fault and the other short-circuit phase fault), such as chaotic inverter switching frequency, dropped response speed, poor dynamic performance, bad current tracking performance, serious noise, and the problem of parameters adjustment with the contradiction between fast response and overshoot caused by traditional current PI control. Additionally, this invention can solve the issue that the existing fault-tolerant field-oriented control strategy can't realize fault-tolerant operation when two phases are with faults. Therefore, a fault-tolerant field-oriented control method of five-phase IPM-FTLM with two nonadjacent short-circuit phase faults is proposed in this invention. It can accurately estimate the back-EMFs, decrease the difficulty of controller parameters adjustment and achieve the goals of the motor system with two nonadjacent phase faults (open-circuit phase faults, short-circuit phase faults, or one open-circuit phase fault and the other short-circuit phase fault), such as high fault-tolerant operation, high dynamic performance, good current tracking performance and lower CPU cost. And also, it can keep inverter switch frequency constant, reduce noise and increase the dynamic performance and reliability of five-phase IPM-FTLM with the two nonadjacent phase faults (open-circuit phase faults, short-circuit phase faults, or one open-circuit phase fault and the other short-circuit phase fault). It can solve any faults of the two nonadjacent phases of the motor (short-circuit phase faults, open-circuit phase faults, or one short-circuit phase fault and the other open-circuit phase fault), and also it has good universality.

SUMMARY OF THE PRESENT INVENTION

The fault-tolerant field-oriented control method of five-phase IPM-FTLM proposed in the invention is described as:

The fault-tolerant field-oriented control method of five-phase IPM-FTLM with two nonadjacent short-circuit phase faults includes the following steps:

(1) Establishing the model of five-phase IPM-FTLM.

(2) The IPM-FTLM is divided into five phases: phase-A, phase-B, phase-C, phase-D and phase-E. When the short-circuit faults occur in phase-B and phase-E, it is assumed that the open-circuit faults only occur in phase-B and phase-E. According to the principle of constant travelling-wave MMF before and after fault, and the constraint about the sum of remaining healthy phase currents is zero, and also the constraint about the amplitude of two adjacent phase phase-C and phase-D currents is equal, then the healthy phase currents of fault-tolerant operation can be obtained when the open-circuit faults of phase-B and phase-E occur.

(3) The extended Clark transformation matrix $T_{post}$ is three columns and two rows, and it is used to transform the variables in the remaining three-healthy-phase natural frame into the two-phase stationary frame, the inverse transformation matrix $T_{post}^{-1}$ is two columns and three rows. $T_{post}$, $T_{post}^{-1}$ and transposed matrix $T_{post}^{T}$ are obtained according to the healthy phase currents.

(4) The healthy phase currents are used to restrain thrust force fluctuation caused by the short-circuit currents of fault phases. After obtaining the short-circuit compensation currents of healthy phases which used to restrain thrust force fluctuation caused by the short-circuit currents of fault phases, then the compensation currents are transformed into the currents in two-phase stationary frame by using the extended Clark transformation matrix $T_{post}$.

(5) The remaining healthy three-phase currents in natural frame are transformed into the currents in two-phase stationary frame by using the extended Clark transformation matrix $T_{post}$, and then the currents subtract the currents obtained in Step 4, it can be obtained the currents $(i_\alpha, i_\beta)$. Then, the Park transformation matrix $C_{2s/2r}$ is used to transform the currents $(i_\alpha, i_\beta)$ into the currents $(i_d, i_q)$ in the synchronous rotating frame.

(5') The remaining healthy three-phase currents in national frame subtract the short-circuit compensation currents of healthy phases, then it can be obtained $(i_A', i_C', i_D')$. And then they can be transformed into the feedback currents in synchronous rotating frame by using the extended Clark transformation matrix $T_{post}$ and Park transformation matrix $C_{2s/2r}$.

(6) The mathematical model of the five-phase IPM-FTLM with two nonadjacent short-circuit phase faults is established in the synchronous rotating frame.

(7) The feed-forward compensation voltages can be obtained by designing the first-order inertia feed-forward voltage compensator, meanwhile, the control voltages can be obtained by the difference values, which are generated by the current references subtracting the feedback currents, going through the current internal mode controller. The sums of the control voltages and the feed-forward compensation voltages are the voltage references in the synchronous rotating frame. It can be transformed into the voltages $(u_\alpha^*, u_\beta^*)$ in two-phase stationary frame by using Park inverse transformation matrix $C_{2r/2s}$.

(8) The back-EMFs of the healthy phases can be observed by the back-EMF observer according to $T_{post}^{T}$, $C_{2r/2s}$ and the permanent-magnetic linkage of the secondary. Then, the back-EMFs of the faulty phases can be calculated based on the back-EMFs of healthy phases.

(9) To make sure that the remaining healthy phases of the motor can output the short-circuit compensation currents, which used to restrain thrust force fluctuation caused by short-circuit currents. The short-circuit compensation voltages of the remaining healthy three-phases can be defined according to the relationship between phase-B short-circuit current and phase-B back-EMF, the relationship between phase-E short-circuit current and phase-E back-EMF, and the mathematical expression of short-circuit compensation currents. Meanwhile, they can be transformed into the short-circuit compensation voltages in two-phase stationary frame by using the extended Clark transformation matrix $T_{post}$.

(10) The voltage references in two-phase stationary frame and short-circuit compensation voltages are added up to the voltage references $(u_\alpha^{}, u_\beta^{})$. The voltage references $(u_\alpha^{}, u_\beta^{})$ can be transformed into the voltage references $(u_A^*, u_C^*, u_D^*)$ in national frame by using the extended Clark inverse transformation matrix $T_{post}^{-1}$. Then voltage references $(u_A^*, u_C^*, u_D^*)$ and the back-EMFs of the remaining healthy phases are added up to the expected phase voltage references $(u_A^{}, u_C^{}, u_D^{**})$, respectively.

(10') The voltage references $(u_\alpha^*, u_\beta^*)$ in two-phase stationary frame can be transformed into the voltage references $(u_A^*, u_C^*, u_D^*)$ in national frame by using the extended Clark inverse transformation matrix $T_{post}^{-1}$. Then, the voltage references $(u_A^*, u_C^*, u_D^*)$ add the short-circuit compensation voltages of the remaining three healthy phases, and then add the back-EMFs of the remaining healthy phases again, respectively, finally, the expected voltage references $(u_A^{}, u_C^{}, u_D^{**})$ are obtained.

(11) The expected voltage references $(u_A^{}, u_C^{}, u_D^{**})$ of Step 10 are passed through the voltage source inverter. Then, five-phase IPM-FTLM can achieve the fault-tolerant undisturbed field-oriented operation by adopting carrier-based pulse width modulation (CPWM) method when the motor is with two nonadjacent short-circuit phase faults.

Further, when open-circuit faults only occur in phase-B and phase-E, it just needs to set the short-circuit compensation currents to zero in Step 4 and to set the short-circuit compensation voltages to zero in Step 9. This fault-tolerant field-oriented control method can achieve fault-tolerant operation of five-phase IPM-FTLM under the two nonadjacent open-circuit phase faults.

When open-circuit fault occurs in phase-B and short-circuit fault occurs in phase-E, it only needs to set the expression of short-circuit compensation current $i_{sc\_B}=0$ in Step 4, and to set the expression of short-circuit compensation voltage $e_B=0$ in Step 9. This fault-tolerant field-oriented control method can achieve fault-tolerant operation of five-phase IPM-FTLM under the phase-B open-circuit fault and phase-E short-circuit fault.

When short-circuit fault occurs in phase-B and open-circuit fault occurs in phase-E, it just needs to set the expression of short-circuit compensation current $i_{sc\_E}=0$ in Step 4, and to set the expression of short-circuit compensation voltage $e_E=0$ in Step 9. This fault-tolerant field-oriented control method can achieve fault-tolerant operation of five-phase IPM-FTLM under the phase-B short-circuit fault and phase-E open-circuit fault.

The invention has the following beneficial effects:

The invention not only ensures fault-tolerant operation under any two nonadjacent short-circuit phase faults (open-circuit phase faults, short-circuit phase faults, or one open-circuit phase fault and the other short-circuit phase fault), but also keeps the dynamic performance and current tracking performance of fault-tolerant operation in consistency with that of healthy operation.

The invention not only effectively restrains the thrust force fluctuation, but also more importantly keeps the dynamic performance and current tracking performance of fault-tolerant operation in consistency with that under healthy condition, on the premise that output thrust force is constant before and after any two nonadjacent phase faults (open-circuit phase faults, short-circuit phase faults, or one open-circuit phase fault and the other short-circuit phase fault). Meanwhile, voltage source inverter switch frequency is constant, noise is low, and CPU cost is small without complex calculation. It is very versatile for solving the any two nonadjacent phase faults (short-circuit phase faults, open-circuit phase faults, or one short-circuit phase fault and the other open-circuit phase fault).

When the inventive fault-tolerant field-oriented control strategy of the two nonadjacent phase faults is activated after phase-B and phase-E with faults, the motor can achieve the same dynamic performance and steady state performance as that under healthy condition, and the output thrust force almost has no fluctuation, the thrust force is the same as that under healthy condition when the currents are inferior to the maximum permissible current of the motor drive system. Then, the undisturbed fault-tolerant operation is achieved.

In this invention, the extended Clark and Park transformation matrices are deduced from the remaining healthy phase-current vectors. Under the two nonadjacent phase faults (open-circuit phase faults, short-circuit phase faults, or one open-circuit phase fault and the other short-circuit phase fault), by using the extended Clark and Park transformation matrices, the currents obtained by the remaining healthy phases steady state currents subtracting the short-circuit compensation currents can be transformed into synchronous rotating frame with equal amplitude mode, and they have no fluctuation. However, when using the traditional Clark and Park transformation matrices under the two nonadjacent phase faults, the remaining healthy phase currents can be transformed into synchronous rotating frame, but obtaining pulsating currents.

By using the extended Clark and Park transformation matrices together, the variables in remaining healthy phases natural frame can be transformed into synchronous rotating frame under two nonadjacent phase faults (open-circuit phase faults, short-circuit phase faults, or one open-circuit phase fault and the other short-circuit phase fault). It creates precondition for the fault-tolerant field-oriented control for the motor with two nonadjacent phase faults.

By using the transposed matrix of extended Clark transformation matrix, the Park inverse transformation matrix and the permanent-magnetic linkage of the secondary together, the accurate estimation of the back-EMFs is achieved under two nonadjacent phase faults (open-circuit phase faults, short-circuit phase faults, or one open-circuit phase fault and the other short-circuit phase fault). Then, the fault-tolerant field-oriented operation under the two nonadjacent phase faults (open-circuit phase faults, short-circuit phase faults, or one open-circuit phase fault and the other short-circuit phase fault) of the motor is achieved.

By using the current internal mode controller and the extended Clark inverse transformation matrix, the Park inverse transformation matrix, the back-EMF observer and the first-order inertial feed-forward voltage compensator together, the nonlinear strongly coupling motor system can be transformed into the first-order inertial system under two nonadjacent phase faults (open-circuit phase faults, short-circuit phase faults, one open-circuit phase fault and the other short-circuit phase fault). Compared with current PI controller, it not only reduces the setting difficulty of controller parameter, but also ensures the current tracking performance, steady state performance and dynamic performance of the motor with two nonadjacent phase faults. Additionally, it can achieve the same dynamic and steady state performance as that under healthy condition, and realize no-overshoot quick response.

(8) By using the extended Clark transformation matrix, the Park transformation matrix and CPWM with zero sequence voltage harmonic injection together, the bus-voltage utilization ratio of inverter is increased, and the complexity of the fault-tolerant field-oriented control algorithm is reduced greatly and CPU cost is decreased.

(9) The combination of the fault-tolerant field-oriented control strategy of two nonadjacent phase faults, the back-EMF estimation strategy, current internal model control strategy, the first-order inertia feed-forward voltage compensation strategy, the CPWM method technology and five-phase IPM-FTLM, greatly increases the fault-tolerant performance, dynamic performance and steady performance of the motor with two nonadjacent phase faults (open-circuit phase faults, short-circuit phase faults, one open-circuit phase fault and the other short-circuit phase fault). Meanwhile, it decreases CPU cost. Compared with the current hysteresis loop control, the noise and the electromagnetic compatibility design difficulty are reduced. Furthermore, it has the higher control precision, better current tracking performance and motor efficiency, the fast output-thrust force response and the same thrust force fluctuation as that under healthy condition when the motor is with two nonadjacent phase faults (open-circuit phase faults, short-circuit phase faults, one open-circuit phase fault and the other short-circuit phase fault). It realizes the high reliability and dynamic performance of the motor with two nonadjacent phase faults (open-circuit phase faults, short-circuit phase faults, or one open-circuit phase fault and the other short-circuit phase fault).

BRIEF DESCRIPTION OF THE DRAWINGS

In the Figures, 1 is primary, 2 is secondary, 3 is silicon steel sheet, 4 is pole shoe, 5 is fault-tolerant teeth, 6 is armature teeth, 7 is end tooth, 8 is permeability magnetic materials, 9 is winding coils.

DETAILED DESCRIPTION OF THE PRESENT INVENTION

The following is combined with the attached drawings of the invention, it is detailed description about the technical solutions of the invention in clear and complete form.

In order to illustrate the structure characteristics and beneficial effects of the five-phase IPM-FTLM of the invention more simply and clearly, a special five-phase IPM-FTLM is used to describe in the following.

(1) The model of five-phase IPM-FTLM is built.

Figure 1:
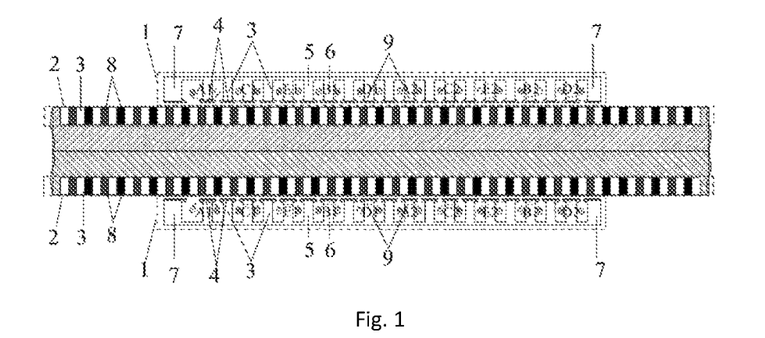
FIG. 1 shows the topology of the five-phase IPM-FTLM in the invention.

FIG. 1 shows the topology structure of the five-phase IPM-FTLM in the invention, including primary 1 and secondary 2. The primary 1 includes pole shoes 4, armature teeth 6, fault-tolerant teeth 5 and concentrated winding coils 9. Meanwhile, the number of armature teeth 6 and fault-tolerant teeth 5 both are 10. Rare earth permanent magnet 8 is embedded in secondary 2, and there is air gap between primary 1 and secondary 2. The part of primary 1 and secondary 2 are made of silicon steel sheet 3 axially laminated expect permanent magnets, winding coils and pole shoes. At the same time, pole shoes 4 are made of electrical iron. In addition, two end teeth 7 of primary 1 are asymmetric, and they are wider than fault-tolerant teeth and armature teeth.

On the basis of traditional CPWM which uses sinusoidal wave as modulation wave, the CPWM method can achieve the same flux-linkage control effect as five-phase SVPWM method, when five-phase sinusoidal modulation wave is injected with c0=(max(ui)+min(ui))/2 zero sequence voltage harmonic ($u_i$ is the each-phase function of five-phase sine-modulation wave) in CPWM method. So the CPWM method based on zero sequence voltage harmonic injection is adopted in the invention.

Figure 2:
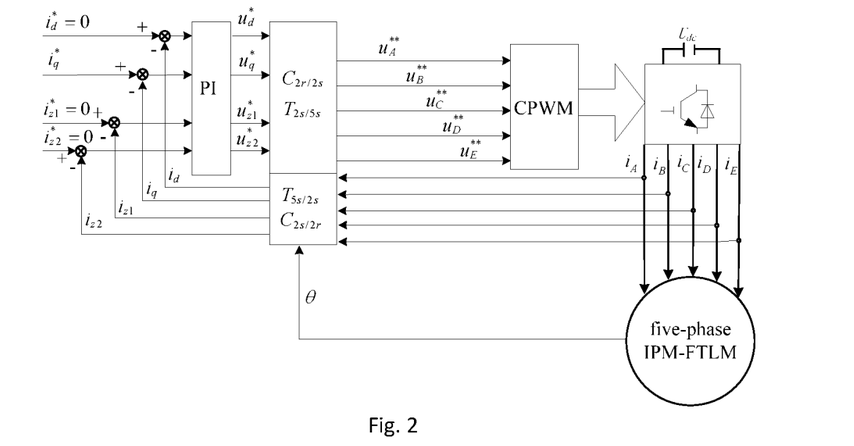
FIG. 2 shows the block diagram of field-oriented control strategy of the five-phase IPM-FTLM in the invention.

The five-phase IPM-FTLM is powered by a voltage source inverter. The motor is divided into phase-A, phase-B, phase-C, phase-D and phase-E. The field-oriented control strategy with CPWM technology based on zero sequence voltage harmonic injection is adopted, and zero sequence current is controlled to zero, the control block diagram is shown in FIG. 2. When the motor operates in the healthy condition, each phase current can be expressed as:

$$\begin{cases} i_A^* = -i_q^*\sin(\theta) + i_d^*\cos(\theta) \\ i_B^* = -i_q^*\sin(\theta - 2\pi/5) + i_d^*\cos(\theta - 2\pi/5) \\ i_C^* = -i_q^*\sin(\theta - 4\pi/5) + i_d^*\cos(\theta - 4\pi/5) \\ i_D^* = -i_q^*\sin(\theta - 6\pi/5) + i_d^*\cos(\theta - 6\pi/5) \\ i_E^* = -i_q^*\sin(\theta - 8\pi/5) + i_d^*\cos(\theta - 8\pi/5) \end{cases} \quad (1)$$

where $i_d^*$, $i_q^*$ are d-axis current reference and q-axis current reference in the synchronous rotating frame, respectively, $$\theta = \int \frac{\pi v}{\tau} dt$$

is electric angle, and v is the electric speed of secondary and $\tau$ is pole pitch.

The travelling-wave MMF generated by the motor can be expressed as:

$$MMF = \sum_{i=A}^{E} MMF_i = Ni_A + aNi_B + a^2 Ni_C + a^3 Ni_D + a^4 Ni_E \quad (2)$$

where $a = e^{j2\pi/5}$, N is the effective turns of each phase winding coils.

(2) When motor is with phase-B and phase-E short-circuit faults, it is assumed that the open-circuit faults only occur in phase-B and phase-E. According to the principle of constant travelling-wave MMF before and after fault, and the constraint about the sum of remaining healthy phase currents is zero, and also the constraint about the amplitude of two adjacent phase-C and phase-D currents is equal, the healthy phase currents of fault-tolerant operation can be obtained after the open-circuit faults occur in phase-B and phase-E.

When the motor is with two nonadjacent phase faults, it can suppose that the short-circuit faults occur in phase-B and phase-E. Firstly, the remaining healthy phase currents can be used to compensate the missing normal thrust force generated by the two phases of short-circuit faults. Then, supposing that open-circuit faults occur in phase-B and phase-E and their phase currents are zero, the travelling-wave MMF is generated by the remaining three-phase healthy phase windings, it can be expressed as:

$$MMF = \sum_{i=A,C,D} MMF_i \quad (3)$$
$$= Ni_A^* + a^2 Ni_C^* + a^3 Ni_D^*$$

To realize undisturbed operation when the motor is with two nonadjacent short-circuit phase faults, it needs to keep the travelling-wave MMF constant before and after fault. Therefore, it is necessary to adjust the remaining healthy phase currents to keep the amplitude and speed of travelling-wave MMF constant before and after fault. Thus, the real and imaginary parts of (2) and (3) are required to equal, respectively.

The motor phase windings are connected in star, and its center point is not connected with the center point of dc-bus voltage. Thus, the sum of phase currents is zero. The healthy phase currents are optimized according to the principle of equal amplitude of adjacent two-phase currents. Supposing that $$\begin{cases} I_C = I_D \\ i_A^* + i_C^* + i_D^* = 0 \end{cases} \quad (4)$$

where $I_C$ and $I_D$ are phase-C and phase-D current amplitude, respectively.

The healthy phase currents are optimized according to the above constraints. Then, the phase-current references of fault-tolerant operation can be expressed as:

$$\begin{cases} i_A^* = 1.381(-i_q^* \sin(\theta) + i_d^* \cos(\theta)) \\ i_B^* = 0 \\ i_C^* = 2.235\left(-i_q^* \sin\left(\theta - \frac{3}{5}\pi\right) + i_d^* \cos\left(\theta - \frac{3}{5}\pi\right)\right) \\ i_D^* = 2.235\left(-i_q^* \sin\left(\theta + \frac{3}{5}\pi\right) + i_d^* \cos\left(\theta + \frac{3}{5}\pi\right)\right) \\ i_E^* = 0 \end{cases} \quad (5)$$

Equation (5) can be represented in matrix form as follows:

$$\begin{bmatrix} i_A^* \\ i_C^* \\ i_D^* \end{bmatrix} = 2.235 \begin{bmatrix} 0.618\cos 0 & 0 \\ \cos\frac{3\pi}{5} & \sin\frac{3\pi}{5} \\ \cos\left(-\frac{3\pi}{5}\right) & \sin\left(-\frac{3\pi}{5}\right) \end{bmatrix} \begin{bmatrix} \cos\theta & -\sin\theta \\ \sin\theta & \cos\theta \end{bmatrix} \begin{bmatrix} i_d^* \\ i_q^* \end{bmatrix} \quad (6)$$

According to (6), it can be obtained:

$$\begin{bmatrix} i_\alpha^* \\ i_\beta^* \end{bmatrix} = \begin{bmatrix} \cos\theta & -\sin\theta \\ \sin\theta & \cos\theta \end{bmatrix} \begin{bmatrix} i_d^* \\ i_q^* \end{bmatrix} = C_{r/s} \begin{bmatrix} i_d^* \\ i_q^* \end{bmatrix} \quad (7)$$

$$\begin{bmatrix} i_A^* \\ i_C^* \\ i_D^* \end{bmatrix} = 2.235 \begin{bmatrix} 0.618\cos 0 & 0 \\ \cos\frac{3\pi}{5} & \sin\frac{3\pi}{5} \\ \cos\left(-\frac{3\pi}{5}\right) & \sin\left(-\frac{3\pi}{5}\right) \end{bmatrix} \begin{bmatrix} i_\alpha^* \\ i_\beta^* \end{bmatrix} \quad (8)$$

The extended Clark transformation matrix $T_{post}$ is three columns and two rows, it can be used to transform the variables in the remaining three-healthy-phase natural frame into the two-phase stationary frame, the inverse transformation matrix $T_{post}^{-1}$ is two columns and three rows. $T_{post}$, $T_{post}^{-1}$, and transposed matrix $T_{post}^T$ are obtained according to the healthy phase currents.

According to (8), the transformation matrix which used to transform two-phase stationary frame into the remaining healthy phase natural frame can be defined as:

$$T_{post}^{-1} = 2.235 \begin{bmatrix} 0.618\cos 0 & 0 & k \\ \cos\frac{3\pi}{5} & \sin\frac{3\pi}{5} & k \\ \cos\left(-\frac{3\pi}{5}\right) & \sin\left(-\frac{3\pi}{5}\right) & k \end{bmatrix} \quad (9)$$

Since the sum of remaining healthy phase currents is zero, the inverse transformation matrix of (9) can be expressed as:

$$T_{post} = \begin{bmatrix} \frac{0.618\cos 0}{1.28} & \frac{\cos\frac{3\pi}{5}}{1.28} & \frac{\cos\left(-\frac{3\pi}{5}\right)}{1.28} \\ 0 & \frac{\sin\frac{3\pi}{5}}{4.043} & \frac{\sin\left(-\frac{3\pi}{5}\right)}{4.043} \\ k & k & k \end{bmatrix} \quad (10)$$

where k is equal to 0.386.

Due to the star connection windings, the sum of phase currents is zero. Thus, when removing the third column of (9) and the third row of (10), the extended Clark inverse transformation matrix and the extended Clark transformation matrix can be re-pressed as:

$$T_{post}^{-1} = 2.235 \begin{bmatrix} 0.618\cos 0 & 0 \\ \cos\frac{3\pi}{5} & \sin\frac{3\pi}{5} \\ \cos\left(-\frac{3\pi}{5}\right) & \sin\left(-\frac{3\pi}{5}\right) \end{bmatrix} \quad (11)$$

$$T_{post} = \begin{bmatrix} \frac{0.618\cos 0}{1.28} & \frac{\cos\frac{3\pi}{5}}{1.28} & \frac{\cos\left(-\frac{3\pi}{5}\right)}{1.28} \\ 0 & \frac{\sin\frac{3\pi}{5}}{4.043} & \frac{\sin\left(-\frac{3\pi}{5}\right)}{4.043} \end{bmatrix} \quad (12)$$

The transposed matrix of (12) can be expressed as:

$$T_{post}^T = \begin{bmatrix} \frac{0.618\cos 0}{1.28} & 0 \\ \frac{\cos\frac{3\pi}{5}}{1.28} & \frac{\sin\frac{3\pi}{5}}{4.043} \\ \frac{\cos\left(-\frac{3\pi}{5}\right)}{1.28} & \frac{\sin\left(-\frac{3\pi}{5}\right)}{4.043} \end{bmatrix} \quad (13)$$

The healthy phase currents are used to restrain thrust force fluctuation caused by the short-circuit currents of fault phases. After calculating the short-circuit compensation currents ($i_A$", $i_D$") of healthy phases which used to restrain thrust force fluctuation caused by the short-circuit currents of fault phases, the short-circuit compensation currents ($i_A$", $i_C$", $i_D$") can be transformed into currents ($i_\alpha$", $i_\beta$") in two-phase stationary frame by using the extended Clark transformation matrix $T_{post}$.

Since the current of zero sequence subspace is zero, it does not need to be transformed into synchronous rotating frame. Energy conversion works in fundamental wave subspace, so it is necessary to transform the energy of fundamental wave subspace into the synchronous rotating frame.

Therefore, the transformation matrix $C_{2s/2r}$ which used to transform two-phase stationary frame into the synchronous rotating frame and its inverse transformation matrix $C_{2r/2s}$ can be defined as:

$$C_{2s/2r} = \begin{bmatrix} \cos\theta & \sin\theta \\ -\sin\theta & \cos\theta \end{bmatrix} \quad (14)$$

$$C_{2r/2s} = \begin{bmatrix} \cos\theta & -\sin\theta \\ \sin\theta & \cos\theta \end{bmatrix} \quad (15)$$

On the basis of part one, the healthy phase currents are used to restrain thrust force fluctuation caused by short-circuit phase currents when motor is with short-circuit phase faults.

Supposing that phase-B and phase-E short-circuit currents are $i_{sc\_B}=I_f \cos(\omega t-\theta_{fB})$ and $i_{sc\_E}=I_f \cos(\omega t-\theta_{fE})$, respectively. $I_f$ is the amplitude of short-circuit current, and $\theta_{fB}$ is angle between back-EMF of phase-B and short-circuit current of phase-B. $\theta_{fE}$ is angle between back-EMF of phase-E and short-circuit current of phase-E. $\omega=\pi v/\tau$, $v$ is the speed of secondary and $\tau$ is pole pitch.

The compensation currents of phase-A, phase-C and phase-D can be defined as:

$$\begin{cases} i''_A = x_A\cos\theta + y_A\sin\theta \\ i''_C = x_C\cos\theta + y_C\sin\theta \\ i''_D = x_D\cos\theta + y_D\sin\theta \end{cases} \quad (16)$$

where $x_A$`$y_A$`$x_C$`$y_C$`$x_D$`$y_D$ are the amplitude of cosine terms and sin terms of the healthy phase compensation currents, respectively.

According to the principle that the sum of health-phase compensation currents which restrain the thrust force fluctuation caused by short-circuit fault phase currents is zero, and the sum of MMFs generated by the healthy phase compensation currents and short-circuit fault-phase currents is zero. The short-circuit compensation currents ($i_A$'''$i_C$'''$i_D$''') of healthy phases which used to restrain thrust force fluctuation caused by fault-phase short-circuit currents can be obtained:

$$\begin{cases} i''_A = -0.1708(i_{sc\_B} + i_{sc\_E}) \\ i''_C = -0.7236 i_{sc\_B} + 0.8944 i_{sc\_E} \\ i''_D = 0.8944 i_{sc\_B} - 0.7236 i_{sc\_E} \end{cases} \quad (17)$$

The extended Clark transformation matrix $T_{post}$ transforms the health-phase compensation currents ($i_A$'''$i_C$'''$i_D$''') into the short-circuit compensation currents ($i\alpha$'''$i_\beta$''') in two-phase stationary frame, and it can be obtained:

$$\begin{cases} i''_\alpha = -0.1237(i_{sc\_B} + i_{sc\_E}) \\ i''_\beta = -0.3806(i_{sc\_B} - i_{sc\_E}) \end{cases} \quad (18)$$

The mathematical model of the motor with two nonadjacent short-circuit phase faults Compared with the self-inductance, the mutual inductance of the IPM-FTLM is much smaller, so the mutual inductance can be ignored. Supposing that phase inductance is almost constant and the back-EMF is sinusoidal waveform. The phasor angles of back-EMFs are determined by their phase windings space location, and the proposed transformation matrices in the invention cannot be used to transform the back-EMFs as currents' transformation. To realize the field-oriented control for the fault-tolerant permanent-magnet linear motor with phase-B and phase-E short-circuit faults, the model of the motor with short-circuit faults can be expressed as follows in natural frame:

$$\begin{cases} u_{Ae} = u_A - e_A = Ri_A + L_s\dfrac{di_A}{dt} \\ -e_B = Ri_B + L_s\dfrac{di_B}{dt} \\ u_{Ce} = u_C - e_C = Ri_C + L_s\dfrac{di_C}{dt} \\ u_{De} = u_D - e_D = Ri_D + L_s\dfrac{di_D}{dt} \\ -e_E = Ri_E + L_s\dfrac{di_E}{dt} \end{cases} \quad (19)$$

where $u_A$, $u_C$ and $u_D$ are healthy phase voltages, $e_A$, $e_C$ and $e_D$ are phase back-EMFs. $u_{Ae}$, $u_{Ce}$ and $u_{De}$ are the values of the healthy phase voltages subtracting the phase back-EMFs, respectively, and R is phase resistance.

(5) The extended Clark transformation matrix $T_{post}$ can be used to transform the remaining healthy three-phase currents ($i_A$`$i_C$`$i_D$) in natural frame into the currents ($i_\alpha$'`$i_\beta$') in two-phase stationary frame. The currents ($i_\alpha$'`$i_\beta$') subtract the short-circuit compensation currents ($i_\alpha$'''`$i_\beta$'''), respectively, it can be obtained the currents ($i_\alpha$`$i_\beta$), and the Park transformation matrix $C_{2s/2r}$ transforms ($i_\alpha$`$i_\beta$) into the currents ($i_d$`$i_q$) in synchronous rotating frame.

Or, the remaining three-phase healthy phase currents ($i_A$`$i_C$`$i_D$) in the natural frame subtract the short-circuit compensation currents ($i_A$'''`$i_C$'''`$i_D$''') of healthy phases which restrain the thrust force fluctuation caused by short-circuit faulty phase currents, and then it can be obtained the currents ($i_A$'`$i_C$'`$i_D$'). Then, the extended Clark transformation matrix $T_{post}$ and Park transformation matrix $C_{2s/2r}$ are used to transform the ($i_A$'`$i_C$'`$i_D$') into the feedback currents ($i_d$`$i_q$) in synchronous rotating frame.

(6) Building the mathematical model of five-phase IPM-FTLM in synchronous rotating frame under two nonadjacent short-circuit phase faults condition.

The model of the motor with nonadjacent two-phase short-circuit faults in natural frame is transformed into the model which can be expressed in synchronous rotating frame as follows:

$$\begin{cases} u_{de} = i_d R + L_s\dfrac{di_d}{dt} - \omega L_s i_q \\ u_{qe} = i_q R + L_s\dfrac{di_q}{dt} - \omega L_s i_d \end{cases} \quad (20)$$

By using magnetic co-energy and (5)-(18), the thrust force equation of the motor with two nonadjacent short-circuit phase fault condition can be expressed as:

$$F = \frac{\pi}{\tau}\left(\frac{1}{2}I_s^T \frac{\partial L_s}{\partial \theta}I_s + I_s^T \frac{\partial \Lambda_m}{\partial \theta}\right) = 2.5\frac{\pi}{\tau}i_q\lambda_m \quad (21)$$

where $\lambda_m$ is the permanent-magnet linkage of the secondary.

Thus, the five-phase IPM-FTLM with two nonadjacent short-circuit phase faults can output the expected thrust force as long as the currents $i_d \, ` \, i_q$ are controlled well in the synchronous rotating frame.

The fault-tolerant field-oriented control strategy of the motor with two nonadjacent short-circuit phases (7) After designing first-order inertia feed-forward voltage compensator, the compensation voltages ($u_d^{comp} \, ` \, u_q^{comp}$) can be obtained by the current references ($i_d^* \, ` \, i_q^*$) in synchronous rotating frame going through the first-order inertia $$\frac{\omega \alpha}{s + \alpha}.$$

The compensation voltages ($u_d^{comp} \, ` \, u_q^{comp}$) can be expressed as:

$$\begin{cases} u_d^{comp} = \frac{\omega\alpha}{s+\alpha}i_q^* \\ u_q^{comp} = \frac{\omega\alpha}{s+\alpha}i_d^* \end{cases} \quad (22)$$

It can be obtained the control voltages ($u_{d0} \, ` \, u_{q0}$) when the difference values, which are obtained by the current references ($i_d^* \, ` \, i_q^*$) subtracting the feedback currents ($i_d \, ` \, i_q$), going through the current internal mode controller $$\alpha L\left(1 + \frac{R}{sL}\right).$$

The sums of the control voltages ($u_{d0} \, ` \, u_{q0}$) and the feed-forward compensation voltages are the voltage references ($u_d^* \, ` \, u_q^*$) in synchronous rotating frame. Then, the voltage references ($u_d^* \, ` \, u_q^*$) can be expressed as:

$$\begin{cases} u_d^* = \alpha L\left(1 + \frac{R}{sL}\right)(i_d^* - i_d) - u_q^{comp} \\ u_q^* = \alpha L\left(1 + \frac{R}{sL}\right)(i_q^* - i_q) - u_q^{comp} \end{cases} \quad (23)$$

The Park inverse transformation matrix $C_{2r/2s}$ is used to transform the voltage references ($u_d^* \, ` \, u_q^*$) into the voltages ($u_\alpha^* \, ` \, u_\beta^*$) in two-phase stationary frame.

(8) By using $T_{post}^T$, $C_{2r/2s}$ and the permanent-magnetic linkage of secondary, the back-EMF observer can be designed, which can be used to observe the back-EMFs ($e_A \, ` \, e_C \, ` \, e_D$) of healthy phases, and it can be expressed as:

$$\begin{bmatrix} e_A \\ e_C \\ e_D \end{bmatrix} = \omega\left(T_{post}^T C_{2r/2s}\begin{bmatrix} 0 \\ 2.5\lambda_m \end{bmatrix} + 0.206\lambda_m \sin\theta\begin{bmatrix} 1 \\ 1 \\ 1 \end{bmatrix}\right) \quad (24)$$

According to the back-EMFs ($e_A \, ` \, e_C \, ` \, e_D$) of healthy phases, the back-EMFs of fault phases can be obtained as:

$$\begin{cases} e_B = \dfrac{e_A + e_C}{2\cos\dfrac{2\pi}{5}} \\ e_E = \dfrac{e_A + e_D}{2\cos\dfrac{2\pi}{5}} \end{cases} \quad (25)$$

(9) According to the relationship between the short-circuit current of phase-B $i_B = i_{sc\_B}$ and the back-EMF of phase-B $e_B$, the relationship between the short-circuit current $i_E = i_{sc\_E}$ of phase-E and back-EMF $e^E$ of phase-E, and the mathematical expression of short-circuit compensation currents, the short-circuit compensation voltages of the remaining healthy three-phases ($u_A'' \, ` \, u_C'' \, ` \, u_D''$) can be defined as:

$$\begin{cases} u_A'' = 0.1708(e_B + e_E) \\ u_C'' = 0.7236e_B - 0.8944e_E \\ u_D'' = -0.8944e_B + 0.7236e_E \end{cases} \quad (26)$$

The extended Clark transformation matrix $T_{post}$ is used to transform (26) into the short-circuit compensation voltages in two-phase stationary frame, and it can be expressed as:

$$\begin{cases} u_\alpha'' = 0.1237(e_B + e_E) \\ u_\beta'' = 0.3806(e_B - e_E) \end{cases} \quad (27)$$

(10) The voltage references ($u_\alpha^* \, ` \, u_\beta^*$) in two-phase stationary frame and the short-circuit compensation voltages ($u_\alpha'' \, ` \, u_\beta''$) are added up to $$\begin{cases} u_\alpha^{**} = u_\alpha^* + 0.1237(e_B + e_E) \\ u_\beta^{**} = u_\beta^* + 0.3806(e_B - e_E) \end{cases} \quad (28)$$

The extended Clark inverse transformation matrix $T_{post}^{-1}$ is used to transform voltage references ($u\alpha^{} \, ` \, u^{\beta}$) into the voltage references ($u_A^* \, ` \, u_C^* \, ` \, u_D^*$) in natural frame. The voltage references ($u_A^* \, ` \, u_C^* \, ` \, u_D^*$) and their phases back-EMFs are added up to the expected phase voltage references ($u_A^{} \, ` \, u_C^{} \, ` \, u_D^{**}$), respectively, which can be expressed as:

$$\begin{bmatrix} u_A^{} \\ u_C^{} \\ u_D^{} \end{bmatrix} = T_{post}^{-1}\begin{bmatrix} u_\alpha^{} \\ u_\beta^{**} \end{bmatrix} + \begin{bmatrix} e_A \\ e_C \\ e_D \end{bmatrix} \quad (29)$$

(10') The extended Clark inverse transformation matrix $T_{post}^{-1}$ is used to transform voltage references ($u_\alpha^* \, ` \, u_\beta^*$) in two-phase stationary frame into the voltage references $(u_A^{*}\text{'}u_C^{*}\text{'}u_D^{*})$ in natural frame. The voltage references $(u_A^{*}\text{'}u_C^{*}\text{'}u_D^{*})$ add the short-circuit compensation voltages $(u_A''\text{'}u_C''\text{'}u_D'')$ of remaining healthy three-phases, respectively. Finally, by adding the back-EMFs $(e_A\text{'}e_C\text{'}e_D)$ of remaining healthy phases again, respectively, the expected voltage references $(u_A^{}\text{'}u_C^{}\text{'}u_D^{**})$ can be expressed as:

$$\begin{bmatrix} u_A^{} \\ u_C^{} \\ u_D^{} \end{bmatrix} = T_{post}^{-1} \begin{bmatrix} u_\alpha^{} \\ u_\beta^{**} \end{bmatrix} + \begin{bmatrix} u_A'' \\ u_C'' \\ u_D'' \end{bmatrix} \begin{bmatrix} e_A \\ e_C \\ e_D \end{bmatrix} \quad (30)$$

(11) The expected phase-voltage references $(u_A^{}\text{'}u_C^{}\text{'}u_D^{**})$ obtained in Step 10 go through voltage source inverter, then CPWM method is used to achieve fault-tolerant field-oriented undisturbed operation when five-phase IPM-FTLM is with two nonadjacent short-circuit phase faults.

Figure 3:
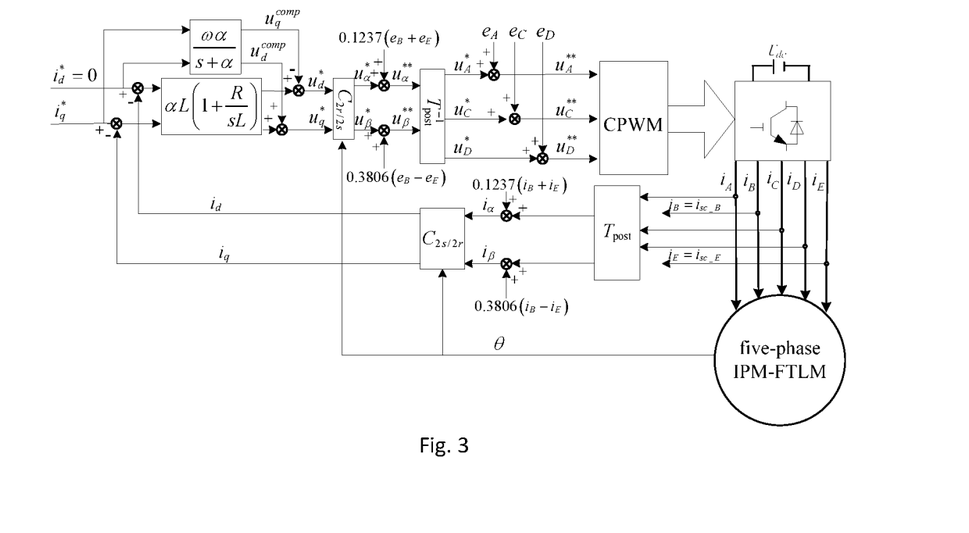
FIG. 3 shows the block diagram 1 of fault-tolerant field-oriented control for the five-phase IPM-FTLM with phase-B and phase-E short-circuit faults in the invention.
Figure 4:
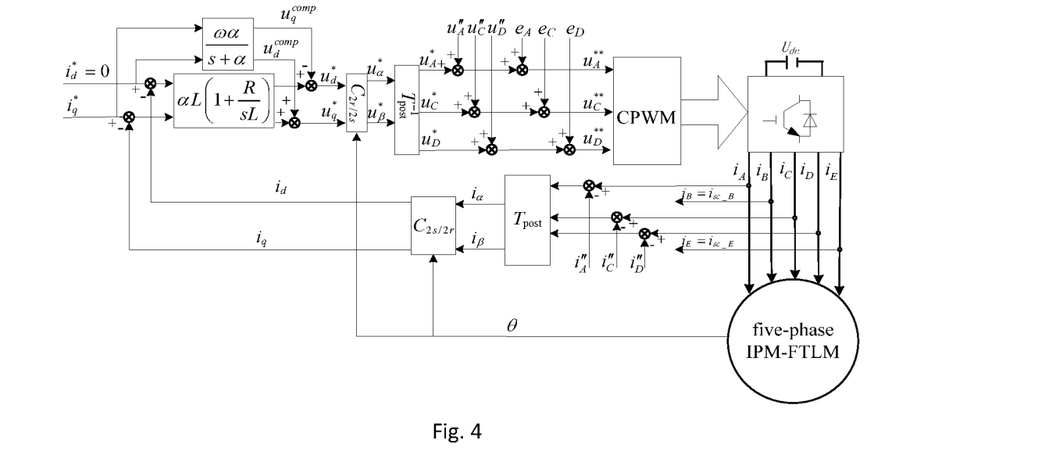
FIG. 4 shows the block diagram 2 of fault-tolerant field-oriented control for the five-phase IPM-FTLM with phase-B and phase-E short-circuit faults in the invention.

The expected phase voltages of (29) or (30) is modulated by the CPWM method based on zero-sequence voltage harmonic injection when they are taken into voltage source inverter, and then the fault-tolerant field-oriented undisturbed operation is achieved when five-phase IPM-FTLM is with phase-B and phase-E short-circuit faults. The fault-tolerant field-oriented control strategy of the two nonadjacent short-circuit phase faults proposed in the invention are shown in FIGS. 3 and 4.

When open-circuit faults occur in phase-B and phase-E, it just needs to set the short-circuit compensation currents of Step 4 to zero, and to set the short-circuit compensation voltages of Step 9 to zero. The fault-tolerant field-oriented control method can achieve the fault-tolerant operation of five-phase IPM-FTLM under two nonadjacent open-circuit phase faults.

When open-circuit fault occurs in phase-B and short-circuit fault occurs in phase-E, it only needs to set the expression of short-circuit compensation current $i_{sc\_B}=0$ in Step 4, and to set the expression of short-circuit compensation voltage $e_B=0$ in Step 9. This fault-tolerant field-oriented control method can achieve fault-tolerant operation of five-phase IPM-FTLM under phase-B open-circuit fault and phase-E short-circuit fault.

When short-circuit fault occurs in phase-B and open-circuit fault occurs in phase-E, it just needs to set the expression of short-circuit compensation current $i_{sc\_E}=0$ in Step 4, and to set the expression of short-circuit compensation voltage $e_E=0$ in Step 9. This fault-tolerant field-oriented control method can achieve fault-tolerant operation of five-phase IPM-FTLM under phase-B short-circuit fault and phase-E open-circuit fault.

When other two nonadjacent phases are with faults, it just needs to counterclockwise rotate the natural frame by $$\frac{2\pi}{5}k$$

electric angle (k=0、1、2、3、4; when phase-B and phase-E are with faults, K=0; when phase-C and phase-A are with faults, K=1; when phase-D and phase-B are with faults, K=2; when phase-E and phase-C are with faults, K=3; when phase-A and phase-D are with faults, K=4), and the Park transformation matrix and its inverse transformation matrix can be expressed as:

$$C_{2s/2r} = \begin{bmatrix} \cos\left(\theta - \frac{2k\pi}{5}\right) & \sin\left(\theta - \frac{2k\pi}{5}\right) \\ -\sin\left(\theta - \frac{2k\pi}{5}\right) & \cos\left(\theta - \frac{2k\pi}{5}\right) \end{bmatrix} \quad (31)$$

$$C_{2r/2s} = \begin{bmatrix} \cos\left(\omega t - \frac{2k\pi}{5}\right) & -\sin\left(\omega t - \frac{2k\pi}{5}\right) \\ \sin\left(\omega t - \frac{2k\pi}{5}\right) & \cos\left(\omega t - \frac{2k\pi}{5}\right) \end{bmatrix} \quad (32)$$

According to FIG. 2, FIG. 3 or FIG. 4, the control system simulation model of five-phase IPM-FTLM as shown in FIG. 1 is built in MATLAB/SIMLINK. By simulation, the simulated results of the fault-tolerant field-oriented control for five-phase IPM-FTLM with two nonadjacent short-circuit phase faults can be obtained.

Figure 5:
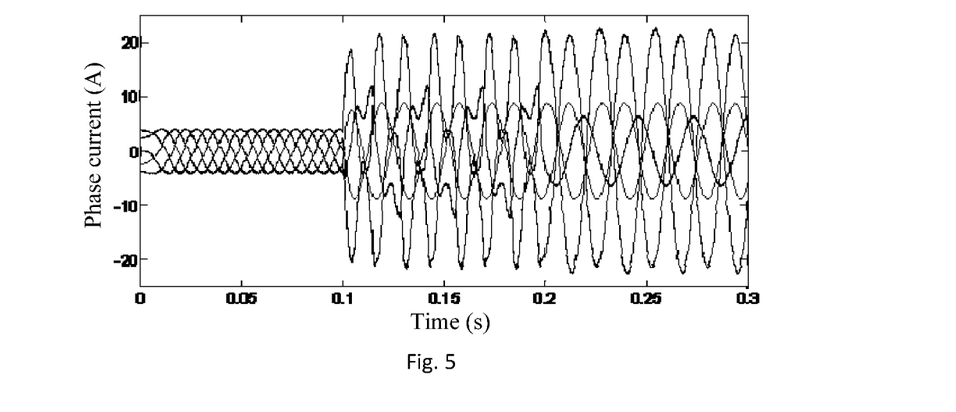
FIG. 5 shows phase-current waveform of no-fault-tolerant and fault-tolerant field-oriented operation under phase-B and phase-E short-circuit fault condition in the invention.
Figure 6:
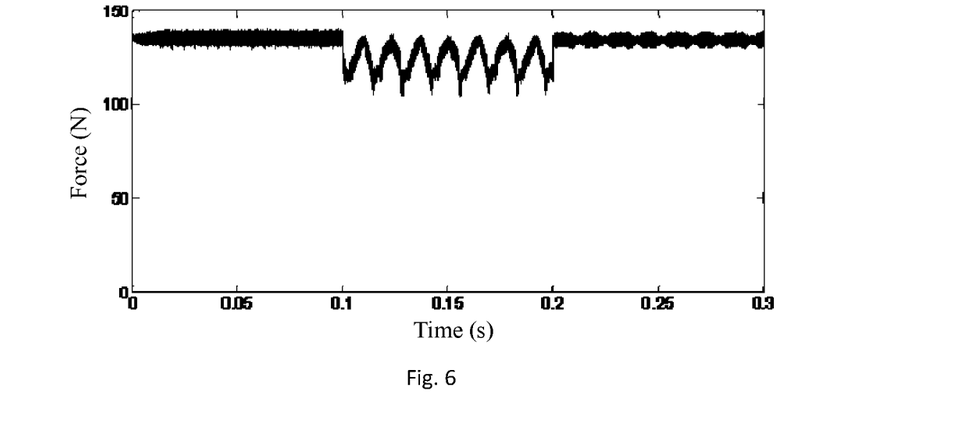
FIG. 6 shows thrust force waveform of no-fault-tolerant and fault-tolerant field-oriented operation under phase-B and phase-E short-circuit fault condition in the invention.
Figure 7:
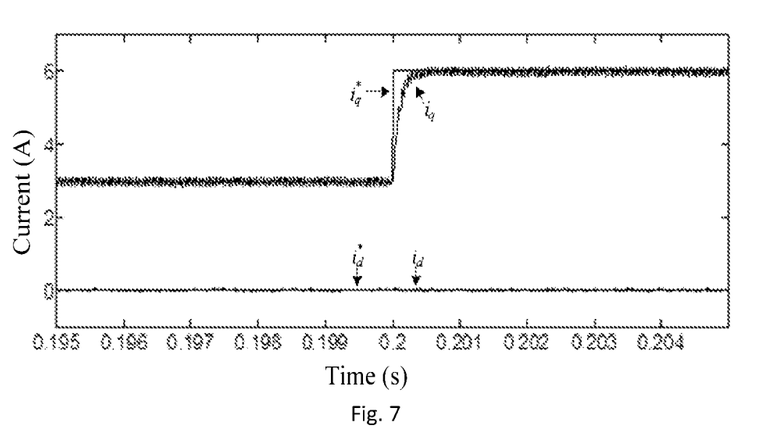
FIG. 7 shows the current waveform in synchronous rotating frame when the thrust force reference steps in the healthy operation in the invention.
Figure 8:
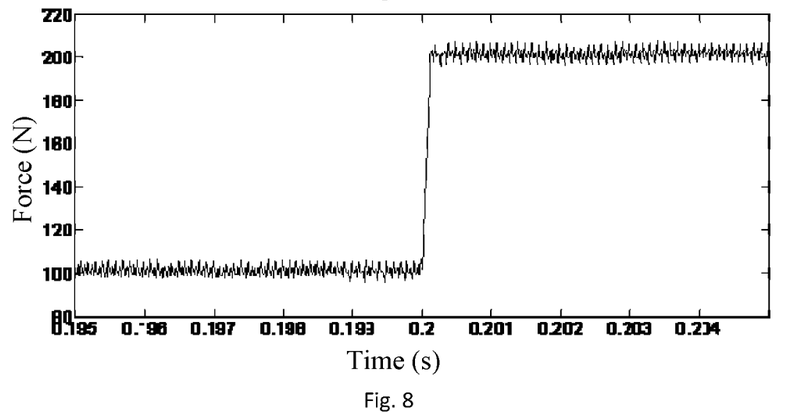
FIG. 8 shows motor output thrust force waveform in synchronous rotating frame when the thrust force reference steps in the healthy operation in the invention.
Figure 9:
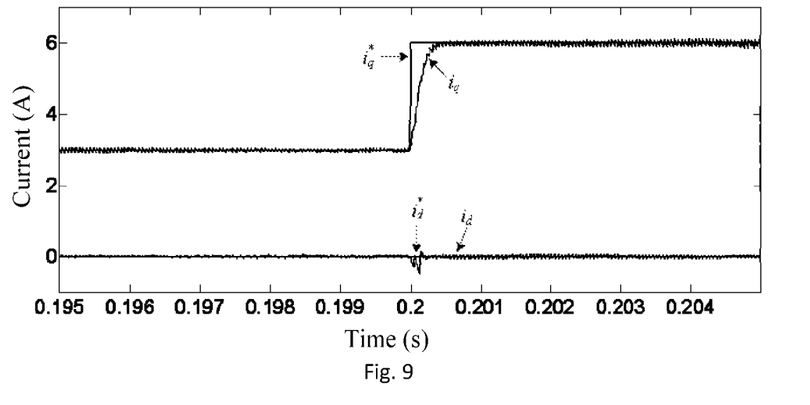
FIG. 9 shows current waveform in synchronous rotating frame when the thrust force reference steps in the fault-tolerant operation under the phase-B and phase-E short-circuit faults condition in the invention.
Figure 10:
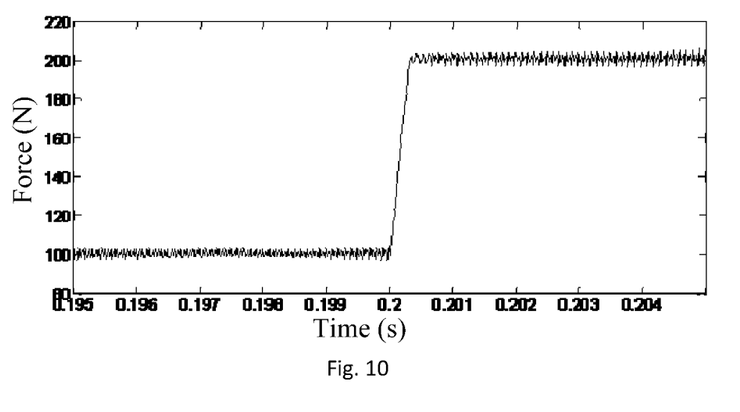
FIG. 10 shows motor output thrust force waveform in synchronous rotating frame when the thrust force reference steps in the fault-tolerant operation under the phase-B and phase-E short-circuit faults condition in the invention.

FIG. 5 is the phase-current waveforms under phase-B and phase-E short-circuit faults. When short-circuit faults occur at 0.1 s, the current waveforms are distorted seriously. However, the sinusoidal currents are obtained when the fault-tolerant field-oriented control strategy is activated at 0.2 s. FIG. 6 is thrust force waveform under phase-B and phase-E short-circuit faults. When short-circuit faults occur at 0.1 s, the thrust force fluctuation is high. The thrust force fluctuation of motor output is obviously restrained when the fault-tolerant field-oriented control strategy is activated at 0.2 s, and thrust force fluctuation almost has no fluctuation. FIGS. 7 and 8 are the current in synchronous rotating frame and output thrust force response, respectively, when thrust force reference steps under healthy condition, and the response time of thrust force is 0.2 s. FIGS. 9 and 10 are the current in synchronous rotating frame and output thrust force response, respectively, when thrust force reference steps under phase-B and phase-E short-circuit faults condition with the fault-tolerant field-oriented control strategy, and the response time of thrust force is 0.3 s. Thus, by using the fault-tolerant field-oriented control strategy, the five-phase IPM-FTLM under two nonadjacent phase faults condition has the same dynamic performance and steady performance as that under healthy condition. Additionally, it also has good current-tracking performance and achieves non-disturbed fault-tolerant operation.

From the above mentioned, under the maximum permissible current of the motor driven system, the inventive fault-tolerant field-oriented control strategy for five-phase IPM-FTLM with two nonadjacent short-circuit phase faults not only ensures the same output thrust force as that under healthy condition, but also clearly restrains the thrust force fluctuation, when the motor is with two nonadjacent phase faults (open-circuit phase faults, short-circuit phase faults, or one open-circuit phase fault and the other short-circuit phase fault). The mostly important is that it has almost the same dynamic performance, steady performance and current tracking accuracy as that under healthy condition, and it is also suitable for the any two nonadjacent phase faults (open-circuit phase faults, short-circuit phase faults, or one open-circuit phase fault and the other short-circuit phase fault). This control strategy has the good generality, and also it does not need complex calculation. In addition, its CPU cost is small, and the setting of current regular parameters is simple. Thus, the invention has a very good application prospect on the system, where a high requirement on operation reliability needs, such as electromagnetic active suspension.

Although the present invention has been made public as above implement example, the example is not used to limit the invention. Any equivalent change or retouching within the spirit and field of the present invention belongs to the protective range of the invention.

What is claimed is:

1. A fault-tolerant field-oriented control method of five-phase interior permanent magnet fault-tolerant linear motor (IPM-FTLM) with two nonadjacent short-circuit phase faults comprising:

(1) establishing the model of five-phase IPM-FTLM including a primary and a secondary magnetic element;

(2) dividing an IPM-FTLM into five phases: phase-A, phase-B, phase-C, phase-D and phase-E, each with a current; wherein a plurality of short-circuit faults occur in phase-B and phase-E and a plurality of open-circuit faults only occur in phase-B and phase-E, according to a principle of constant traveling-wave magnetic motive force (MMF) both before and after open-circuit faults occur; and wherein a sum of a number of a healthy phase current of each not faulted phase is zero, and an amplitude of adjacent phase-C and phase-D currents is equal, wherein the healthy phase currents of fault-tolerant operation can be obtained after the open-circuit faults occur in phase-B and phase-E:

$$\begin{cases} i_A^* = 1.381(-i_q^*\sin(\theta) + i_d^*\cos(\theta)) \\ i_C^* = 2.235\left(-i_q^*\sin\left(\theta - \frac{3}{5}\pi\right) + i_d^*\cos\left(\theta - \frac{3}{5}\pi\right)\right) \\ i_D^* = 2.235\left(-i_q^*\sin\left(\theta + \frac{3}{5}\pi\right) + i_d^*\cos\left(\theta + \frac{3}{5}\pi\right)\right) \end{cases};$$

where $i_d^*$, $i_q^*$ are d-axis and q-axis current references in the synchronous rotating frame, respectively, $$\theta = \int \frac{\pi v}{\tau} dt$$

is electric angle, $v$ is the electric speed of the secondary magnetic element, and $\tau$ is pole pitch;

(3) transforming the remaining three-healthy-phase natural frame into a two-phase stationary frame with a extended Clark transformation matrix $T_{post}$ having three columns and two rows; wherein an inverse transformation matrix $T_{post}^{-1}$ has two columns and three rows; wherein $T_{post}$, $T_{post}^1$ and a transposed matrix $T_{post}^T$ are obtained according to the healthy phase currents:

$$T_{post} = \begin{bmatrix} \frac{0.618\cos0}{1.28} & \frac{\cos\frac{3\pi}{5}}{1.28} & \frac{\cos\left(-\frac{3\pi}{5}\right)}{1.28} \\ 0 & \frac{\sin\frac{3\pi}{5}}{4.043} & \frac{\sin\left(-\frac{3\pi}{5}\right)}{4.043} \end{bmatrix}$$

$$T_{post}^{-1} = 2.235 \begin{bmatrix} 0.618\cos0 & 0 \\ \cos\frac{3\pi}{5} & \sin\frac{3\pi}{5} \\ \cos\left(-\frac{3\pi}{5}\right) & \sin\left(-\frac{3\pi}{5}\right) \end{bmatrix}$$

$$T_{post}^T = \begin{bmatrix} \frac{0.618\cos0}{1.28} & 0 \\ \frac{\cos\frac{3\pi}{5}}{1.28} & \frac{\sin\frac{3\pi}{5}}{4.043} \\ \frac{\cos\left(-\frac{3\pi}{5}\right)}{1.28} & \frac{\sin\left(-\frac{3\pi}{5}\right)}{4.043} \end{bmatrix}$$

(4) restraining a thrust force fluctuation caused by the short-circuit currents of the phases in fault in combination with the healthy phase currents; wherein after calculating the short-circuit compensation currents ($i_A''$, $i_C''$, $i_D''$) of the healthy phases which used to restrain the thrust force fluctuation caused by the short-circuit currents of fault phases, the short-circuit compensation currents ($i_A''$, $i_C''$, $i_D''$) are transformed into currents ($i_\alpha''$, $i_\beta''$) in a two-phase stationary frame by using the extended Clark transformation matrix, $T_{post}$;

(5) transforming a plurality of remaining healthy three-phase currents ($i_A'$, $i_C'$, $i_D'$) in natural frame into the currents ($i_\alpha'$, $i_\beta'$) in two-phase stationary frame by using the extended Clark transformation matrix $T_{post}$, and then the currents ($i_\alpha'$, $i_\beta'$) subtract the currents ($i_\alpha''$, $i_\beta''$) obtained in Step 4, and obtaining the currents ($i_\alpha$, $i_\beta$); wherein a Park transformation matrix $C_{2s/2r}$ is used to transform the currents ($i_\alpha$, $i_\beta$) into the currents ($i_d$, $i_q$) in the synchronous rotating frame;

(5') subtracting short-circuit compensation currents ($i_A''$, $i_C''$, $i_D''$) of the healthy phases from the plurality of remaining healthy three-phase currents ($i_A'$, $i_C'$, $i_D'$) in a natural frame, obtaining ($i_A'''$, $i_C'''$, $i_D'''$) which are transformed into the currents ($i_d$, $i_q$) in synchronous rotating frame according to the extended Clark transformation matrix $T_{post}$ and the Park transformation matrix $C_{2s/2r}$;

(6) establishing a mathematical model of the five-phase IPM-FTLM with at least two nonadjacent short-circuit phase faults in the synchronous rotating frame;

(7) designing a first-order inertia voltage feed-forward compensator, wherein feed-forward compensation voltages ($u_d^{comp}$, $u_q^{comp}$) can be obtained by the current references ($i_d^*$, $i_q^*$) of synchronous rotating frame going through a first-order inertia $$\frac{\omega\alpha}{s+\alpha};$$

and wherein control voltages ($u_{d0}$, $u_{q0}$) can be obtained by the difference in values, which are generated by subtracting the feedback currents ($i_d$, $i_q$) from current references ($i_d^*$, $i_q^*$), through a current internal mode controller $$\alpha L\left(1 + \frac{R}{sL}\right);$$

and wherein a sum of the control voltages ($u_{d0}$、$u_{q0}$) and the feed-forward compensation voltages ($u_d^{comp}$、$u_q^{comp}$) are the voltage references ($u_d^*$、$u_q^*$) in a synchronous rotating frame; and wherein the voltage references ($u_d^*$、$u_q^*$) can be transformed into voltages ($u_\alpha^*$、$u_\beta^*$) in two-phase stationary frame by using Park inverse transformation matrix $C_{2r/2s}$;

(8) observing the back electromotive forces (EMFs) ($e_A$、$e_C$、$e_D$) of the healthy phases by a back-EMF observer according to $T_{post}^T$, $C_{2r/3s}$, and a permanent magnet linkage of the secondary magnetic element:

$$\begin{bmatrix} e_A \\ e_C \\ e_D \end{bmatrix} = \omega\left(T_{post}^T C_{2r/2s}\begin{bmatrix} 0 \\ 2.5\lambda_m \end{bmatrix} + 0.206\lambda_m \sin\theta \begin{bmatrix} 1 \\ 1 \\ 1 \end{bmatrix}\right)$$

wherein the back-EMFs ($e_B$、$e_E$) of the faulty phases can be calculated according to the back-EMFs ($e_A$、$e_C$、$e_D$) of healthy phases:

$$\begin{cases} e_B = \dfrac{e_A + e_C}{2\cos\dfrac{2\pi}{5}} \\ e_E = \dfrac{e_A + e_D}{2\cos\dfrac{2\pi}{5}} \end{cases}$$

(9) verifying that a remaining healthy phase current of the motor can output short-circuit compensation currents ($i_A''$、$i_C''$、$i_D''$), and used to restrain the thrust force fluctuation caused by short-circuit currents; wherein the short-circuit compensation voltages of the remaining healthy three-phases ($u_A''$、$u_C''$、$u_D''$) can be defined as $$\begin{cases} u_A'' = 0.1708(e_B + e_E) \\ u_C'' = 0.7236e_B - 0.8944e_E \\ u_D'' = -0.8944e_B + 0.7236e_E \end{cases}$$

according to the relationship between a phase-B short-circuit current $i_B = i_{sc\_B}$; and wherein a phase-B back-EMF $e_B$, the relationship between phase-E short-circuit current $i_E = i_{sc\_E}$; and a phase-E back-EMF $e_E$, and a mathematical expression of short-circuit compensation currents; wherein the short-circuit compensation currents can be transformed into a short-circuit compensation voltages $$\begin{cases} u_\alpha'' = 0.1237(e_B + e_E) \\ u_\beta'' = 0.3806(e_B - e_E) \end{cases}$$

in two-phase stationary frame by using the extended Clark transformation matrix $T_{post}$;

(10) adding the voltage references ($u_\alpha^*$、$u_\beta^*$) in two-phase stationary frame and short-circuit compensation voltages ($u_\alpha''$、$u_\beta''$) are added up to the voltage references $$\begin{cases} u_\alpha^{**} = u_\alpha^* + 0.1237(e_B + e_E) \\ u_\beta^{**} = u_\beta^* + 0.3806(e_B - e_E) \end{cases};$$

wherein the voltage references ($u_\alpha^{}$、$u_\beta^{}$) can be transformed into the voltage references ($u_A^*$、$u_C^*$、$u_D^*$) in the natural frame by using the extended Clark inverse transformation matrix $T_{post}^{-1}$; wherein voltage references ($u_A^*$、$u_C^*$、$u_D^*$) and the back-EMFs ($e_A$、$e_C$、$e_D$) of the remaining healthy phases are added up to yield an expected phase voltage references ($u_A^{}$、$u_C^{}$、$u_D^{**}$), respectively;

(10') transforming the voltage references ($u_\alpha^*$、$u_\beta^*$) in two-phase stationary frame into the voltage references ($u_A^*$、$u_C^*$、$u_D^*$) in natural frame by using the extended Clark inverse transformation matrix $T_{post}^{-1}$; wherein the voltage references ($u_A^*$、$u_C^*$、$u_D^*$) add the short-circuit compensation voltages ($u_A''$、$u_C''$、$u_D''$) of remaining three healthy phases; wherein expected voltage references ($u_A^{}$、$u_C^{}$、$u_D^{}$) can be obtained by adding the back-EMFs ($e_A$、$e_C$、$e_D$) of the remaining healthy phases to the short circuit compensation voltages, respectively; and (11) reacting to the occurrence of two nonadjacent short-circuit phase faults the expected voltage references ($u_A^{}$、$u_C^{}$、$u_D^{}$) of Step 10 are passed through a voltage source inverter, then a fault-tolerant vector non-disturbed operation of five-phase IPM-FTLM is accomplished by adopting a carrier pulse width modulation (CPWM) method.

2. The fault-tolerant field-oriented control method of five-phase IPM-FTLM with two nonadjacent short-circuit phase faults of claim 1 wherein:

when the open-circuit phase faults only occur in phase-B and phase-E, the short-circuit compensation currents are set to zero in Step 4 and the short-circuit compensation voltages are set to zero in Step 9 and fault-tolerant operation is achieved under the condition of two nonadjacent open-circuit phase faults;

when the open-circuit fault occurs in phase-B and short-circuit fault occurs in phase-E, the expression of short-circuit compensation current $i_{sc\_B}=0$ in Step 4, and the expression of short-circuit compensation voltage $e_B=0$ in Step 9, and fault-tolerant operation is achieved under phase-B open-circuit fault and phase-E short-circuit fault;

when the short-circuit fault occurs in phase-B and the open-circuit fault occurs in phase-E, the expression of short-circuit compensation current $i_{sc\_E}=0$ in Step 4, and the expression of short-circuit compensation voltage $e_E=0$ in Step 9; and fault-tolerant operation is achieved under phase-B short-circuit fault and phase-E open-circuit fault.

3. The fault-tolerant field-oriented control method of five-phase IPM-FTLM with two nonadjacent short-circuit phase faults of claim 1 wherein Step 4 further comprises:

(4.1) the phase-B and phase-E short-circuit currents are $i_{sc\_B}=I_f\cos(\omega t-\theta_{fB})$ and $i_{sc\_E}=I_f\cos(\omega t-\theta_{fE})$, respectively; where, $I_f$ is the amplitude of short-circuit current, and $\theta_{fB}$ is angle between back-EMF of phase-B and short-circuit current of phase-B, $\theta_{fE}$ is angle between back-EMF of phase-E and short-circuit current of phase-E, $\omega=\pi v/\tau$, $v$ is electric speed of the secondary magnetic element and $\tau$ is pole pitch;

(4.2) a sum of healthy phase compensation currents used to restrain the thrust force fluctuation caused by the short-circuit fault-phase currents is zero, and the sum of MMFs generated by the healthy phase compensation currents and short-circuit fault-phase currents is zero; obtaining the short-circuit compensation currents ($i_A'''$、$i_C'''$、$i_D'''$) of healthy phases:

$$\begin{cases} i''_A = -0.1708(i_{sc\_B} + i_{sc\_E}) \\ i''_C = -0.7236 i_{sc\_B} + 0.8944 i_{sc\_E} \\ i''_D = 0.8944 i_{sc\_B} - 0.7236 i_{sc\_E} \end{cases}$$

(4.3) transforming the healthy phase compensation currents ($i_A''$、$i_C''$、$i_D''$) with the extended Clark transformation matrix $T_{post}$ into the short-circuit compensation currents ($i_\alpha''$、$i_\beta''$) in two-phase stationary frame:

$$\begin{cases} i''_\alpha = -0.1237(i_{sc\_B} + i_{sc\_E}) \\ i''_\beta = -0.3806(i_{sc\_B} - i_{sc\_E}) \end{cases}.$$

4. The fault-tolerant field-oriented control method of five-phase IPM-FTLM with two nonadjacent short-circuit phase faults of claim 1 wherein Step 6 further comprises:

(6.1) the phase inductance is almost constant $L_s$; after subtracting the back-EMFs from the motor phase voltages, phase-B and phase-E short-circuit faults in natural frame:

$$\begin{cases} u_{Ae} = u_A - e_A = Ri_A + L_s \dfrac{di_A}{dt} \\ -e_B = Ri_B + L_s \dfrac{di_B}{dt} \\ u_{Ce} = u_C - e_C = Ri_C + L_s \dfrac{di_C}{dt} \\ u_{De} = u_D - e_D = Ri_D + L_s \dfrac{di_D}{dt} \\ -e_E = Ri_E + L_s \dfrac{di_E}{dt} \end{cases}$$

where $u_A$, $u_C$ and $u_D$ are the healthy phase voltages, $e_A$, $e_B$, $e_C$, $e_D$ and $e_E$ are the phase back-EMF; $u_{Ae}$, $u_{Ce}$ and $u_{De}$ are the values of the healthy phase voltages subtracting phase back-EMFs, respectively, and R is phase resistance;

(6.2) the healthy phase currents are handled according to the Step 5; then the model of two nonadjacent short-circuit phase faults in the natural frame is transformed into model in the synchronous rotating frame using the extended Clark transformation matrix $T_{post}$ and Park transformation matrix $C_{2s/2r}$ yielding $$\begin{cases} u_{de} = i_d R + L_s \dfrac{di_d}{dt} - \omega L_s i_q \\ u_{qe} = i_q R + L_s \dfrac{di_q}{dt} + \omega L_s i_d \end{cases};$$

(6.3) by using magnetic co-energy and transformation matrix $T_{post}$, $C_{2s/2r}$ and with two nonadjacent short-circuit phase faults, the thrust force:

$$F = 2.5 \dfrac{\pi}{\tau} i_q \lambda_m$$

where $\lambda_m$ is permanent magnet linkage.

5. The fault-tolerant field-oriented control method of five-phase IPM-FTLM with two nonadjacent short-circuit phase faults of claim 1 wherein the mentioned field-oriented control method of two nonadjacent short-circuit phase faults is a five-phase fault-tolerant permanent magnet rotary motor.

* * * * *